United States Patent [19]

McKenzie

[11] 3,973,355
[45] Aug. 10, 1976

[54] SELF-CONTAINED HYDROPHILIC PLANT GROWTH MATRIX AND METHOD

[75] Inventor: John H. McKenzie, Houston, Tex.

[73] Assignee: Agritec Co., Houston, Tex.

[22] Filed: June 11, 1975

[21] Appl. No.: 585,915

Related U.S. Application Data

[63] Continuation-in-part of Ser. No. 434,823, Jan. 18, 1974, abandoned, which is a continuation-in-part of Ser. No. 222,119, Jan. 31, 1972, abandoned.

[52] U.S. Cl. .................................... 47/37; 71/64 A; 47/34.13; 47/57.6; 260/2.5 BE; 47/DIG. 7
[51] Int. Cl.² ............................................ A01G 9/10
[58] Field of Search ............... 47/37, 34.13, DIG. 7, 47/56, 57.6; 260/2.5 R, 2.5 A, 2.5 BE; 71/64

[56] References Cited
UNITED STATES PATENTS

| | | | |
|---|---|---|---|
| 3,336,129 | 8/1967 | Herrett et al. | 47/DIG. 7 |
| 3,373,009 | 3/1968 | Pruitt et al. | 47/DIG. 7 |
| 3,472,644 | 10/1969 | Woodside et al. | 47/DIG. 7 |
| 3,513,593 | 5/1970 | Beck | 47/34.13 |
| 3,799,755 | 3/1974 | Rack | 47/37 UX |
| 3,812,619 | 5/1974 | Wood et al. | 47/37 X |
| 3,834,072 | 9/1974 | Rack | 47/37 |
| 3,835,584 | 9/1974 | Shimazu | 47/37 |
| 3,877,172 | 4/1975 | Schwab et al. | 47/37 X |
| 3,899,850 | 8/1975 | Gluck et al. | 47/37 |

Primary Examiner—Robert E. Bagwill
Attorney, Agent, or Firm—Fulbright & Jaworski

[57] ABSTRACT

Methods of making and a self-contained hydrophilic plant growth matrix having excellent water holding properties for germination of seeds, propagation of cuttings and growth of plants are disclosed. The hydrophilic plant growth matrix is a dried, gelled plant growth particulate material mix, a cohesive plant mass which retains its shape and dimensional stability after rewetting. It may be formed in various shapes, such as pellets, plugs, cylinders, rods, blocks and the like. The gelled plant growth mix may be inserted in a plant matrix carrier or container which does not confine or impede root growth in any direction, such as an open cell foam, and preferably one which contains necessary nutrients for plant growth. The dried foam matrix has from about one-half of one to about five percent by weight, of a particulate, water-insoluble, water-swellable, cross-linked polymer dispersed throughout based on the dry weight of the plant growth particles. A gel of from ½ to 3% polymer in water is made and which is then mixed with and coats particles of growth material and dried, preferably to about 1% moisture. A number of examples is set forth and the drawings illustrate various physical embodiments of the invention.

28 Claims, 12 Drawing Figures

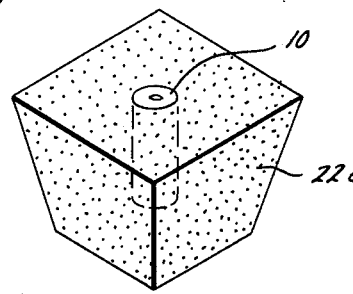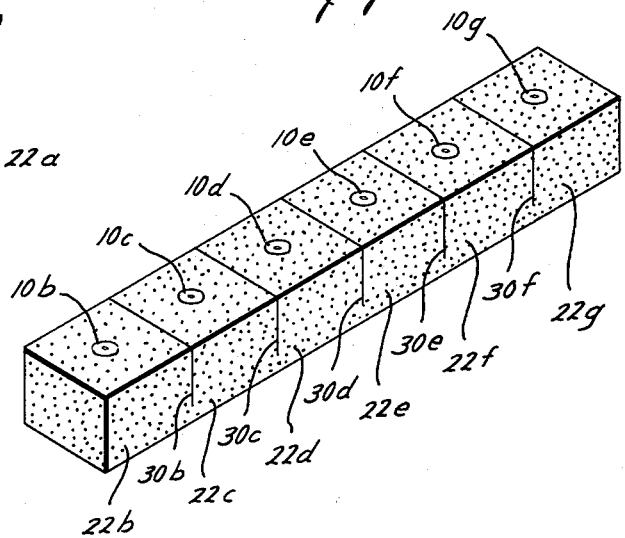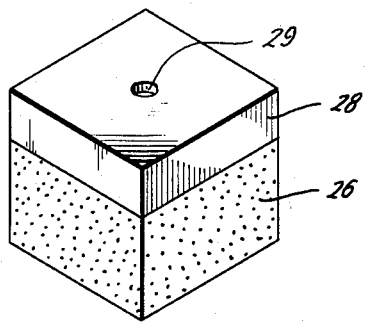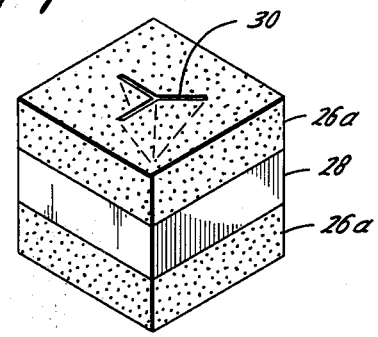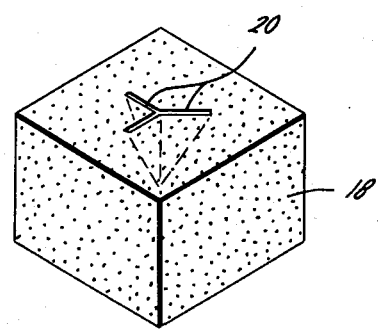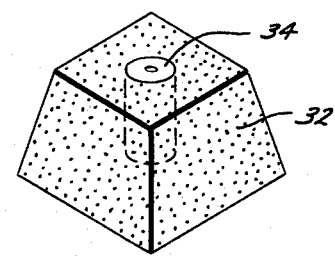

SELF-CONTAINED HYDROPHILIC PLANT GROWTH MATRIX AND METHOD

CROSS-REFERENCE TO RELATED APPLICATION

The present application is a continuation-in-part of application Ser. No. 434,823 filed Jan. 18, 1974, which in turn is a continuation-in-part of Ser. No. 222,119 filed Jan. 31, 1972, both now abandoned in favor of this application.

BACKGROUND OF THE INVENTION

The present invention relates to a self-contained, dimensionally stable matrix for the germination of seeds and the growth of plants and methods of manufacturing them. More particularly, the present invention relates to a dimensionally stable, self-contained hydrophilic plant growth matrix or cohesive mixture having remarkable moisture-holding properties in which seeds may be encapsulated for germination and growth.

Efforts have been made to provide a suitable matrix or "container" for mechanized or automated germination and growth of seedlings and cuttings, particularly in large scale agricultural, horticultural, and reforestation operations. For example, there has been a need to provide automated growing of conifer and hardwood seedlings and outplanting of such seedlings in reforestation in the southern states for at least ten months of the year, as against the present one or two months of outplanting possible with bare root planting, thus making more efficient use of labor and facilities. This is a major problem in that it is necessary to replant at least one billion pine trees a year at present to provide adequate reforestation in the United States of America alone. In addition, at the present time some six billion tabacco seedlings are planted by hand or by semi-automatic methods each year in the United States of America alone. A similar problem exists in other countries and with other plants, for example flowers, vegetables and the like.

One approach to solve this problem has been to provide a wide range of containers, for example, paper tubes, plastic tubes, plastic webbing and plastic tray molds filled with various potting mixtures for seed germination and growth. These have not been entirely satisfactory because, among other reasons, these containers confine the root system within the container in the early stages, which has an effect on future root development and subsequent growth. Particularly, the lack of lateral root growth during the confinement period results in reduced lateral root growth of the seedling when planted in the ground and, hence, minimum lateral support for the tree. Also, these types of containers are relatively expensive and have a relatively high gross weight when filled with potting soil, both wet and dry. Moreover, some plastic tubes fail to split open to permit root emergence and continued growth. In some soils and climates paper tubes disintegrate rapidly, but in others they remain intact after months of planting. The plastic tray molds filled with unconsolidated soil are not suitable for automatic planting in that the plug, when removed, depends entirely upon the root structure and encirclement to hold the soil together.

Another approach to the problem is compressed peat, various molded cubes and the like (Br-8, Kys Kube), but these do not always hold together well and generally contain insufficient supplies of nutrients.

Other efforts to solve the problem of large-scale or automatic commercial plantings have been by providing a foamed plant matrix, such as disclosed in U.S. Pat. Nos. 3,373,009; 2,988,441; and Re 24,820. These foamed matrixes are generally hydrophobic, although some of them are stated to be hydrophilic in that they retain some water. These opencelled foams referred to in the above patents generally do not retain sufficient water for plant growth purposes or perform satisfactorily for proper germination and plant growth.

The present invention is directed to a dimensionally stable, self-contained hydrophilic plant growing matrix which soaks up and retains a relatively large quantity of water, in which water is maintained about the seedling or cuttings for longer periods of time than in other synthetic materials or in such portions of the matrix as may be desirable, in which germination or propagation takes place and growth of the root structure is not confined and lateral root growth is permitted, which is relatively light in weight, both wet and dry, which is economical and which permits automated outplanting of seedlings thus overcoming disadvantages of prior efforts and providing a solution to the problem of largescale commercial planting, reforestation and the like, and methods of making these plant growing matrixes.

SUMMARY

The present invention relates to an improved dimensionally stable, self-contained hydrophilic plant growth media or matrixes for germination of seeds and growth of plants and to methods of making them. More particularly, the invention relates to such a plant growth media which provides proper moisture and nutrients in which germination of seeds and growth of plants may be accomplished and the growth media may be formed into various shapes and sizes which easily lend themselves to subsequent automation in outplanting.

It is highly desirable, and it is an object of this invention, to provide a dimensionally stable, self-contained hydrophilic plant growth matrix, and methods of manufacturing them, for germination of seedlings and plant growth including a gelled particulate material mix which will adsorb relatively large quantities of water and retain its shape on wetting and rewetting, which is economical and convenient to use in that it reduces labor costs in propagation and transplanting, and which is adaptable to automation in planting.

It would be advantageous, and it is an object of the present invention, to provide self-contained hydrophilic plant growth matrixes of gelled plant growth particles, and methods of manufacturing them, which are of relatively low gross weight, both wet and dry, which retain their shapes on wetting and rewetting and thus permit ease in handling, shipping and planting of seedlings.

It would be advantageous, and it is an object of the present invention, to provide such hydrophilic plant growth matrixes, and methods of manufacturing them, which include agricultural chemicals, such as nutrients which are slowly released over growing periods and which can be readily varied to meet specific plant requirements as to nutrients, pH and the like.

It would also be advantageous, and it is an object of the present invention, to provide such hydrophilic plant growing matrixes, and methods of manufacturing them, in which other agricultural chemicals, such as systemic pesticides and fungicides, growth regulators, herbicides, hormones and the like can be incorporated and which require no sterilization.

It would be advantageous, and it is an object of the present invention, to provide dimensionally stable, hydrophilic plant growing matrixes of gelled plant growth particles, and methods of manufacturing them, which are of uniform consistency, are self-contained, which permit uniform, consistent root penetration without confining root growth in early stages and permit lateral root growth during the confinement period, and which provide good aeration.

It would be advantageous, and it is a further object of the present invention, to provide self-contained hydrophilic plant growing matrixes, and methods of manufacturing them, which permit planting or transplanting with minimum root shock.

It is highly desirable, and it is an object of the present invention, to provide a hydrophilic plant growing matrix, and methods of manufacturing them, which will not separate into layers or disintegrate on handling or wetting and rewetting and which are nontoxic to plants.

A further object of the present invention is the provision of a self-contained plant growing matrix, and methods of making them, which retains moisture where desired, that is about the seed on germination, rather than permitting the water to drain away from the seed.

In the planting of trees, such as in large-scale reforestation plantings, it is highly desirable to provide a self-contained plant growing matrix for the tree seedlings which will permit unconfined growth of the roots so that lateral roots are permitted to grow in addition to the tap root thereby permitting the growth of lateral roots when planted to thereby provide support to the trees. It is an object of the present invention to provide such plant matrixes and methods of making them.

A further object of the invention is the provision of a self-contained germination and growing media, and methods of manufacturing them, which include an insert with or without added nutrients having good water retention properties embedded in a nutrient synthetic foam also having good water retention properties in which unconfined root growth is stimulated.

It would be also desirable, and it is an object of the present invention, to provide a plant growth matrix, and methods of manufacturing them, for encapsulation of seeds so that they are self-contained and may be automatically planted in the ground or "broadcast" on the ground in any desired manner, and when moisture is provided to the matrix, such as during irrigation, rains or when snowing, the seedlings will germinate inside the matrix and the plant will grow.

Other and further objects, advantages and features of the invention will be apparent from the following description of presently preferred embodiments of the invention, given for the purpose of disclosure.

BRIEF DESCRIPTION OF THE DRAWINGS

FIG. 7 is a perspective view of a modified form of FIG. 3 particularly suitable for propagation of flowers and vegetables;

FIG. 8 is a perspective view illustrating a manner of manufacture of the blocks of FIG. 3;

FIG. 9 is a perspective view illustrating a layer of a gelled plant growth mix on an open cell foam or other suitable matrix;

FIG. 10 is a perspective view of a sandwich modification of FIG. 9;

FIG. 11 is a perspective view of a block of an open cell foam having a water-swellable material dispersed throughout; and FIG. 12 is a perspective view of a germination-type insert containing no nutrients inserted into a block of mix containing nutrients.

DESCRIPTION OF THE PREFERRED EMBODIMENTS

Figure 1:
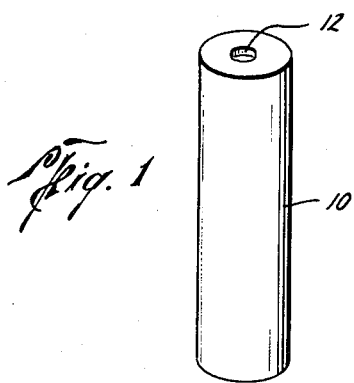
FIG. 1 is a perspective view of a gelled plant growth mix according to the invention shown in the form of a cylinder.

One aspect of the present invention is the provision of a dimensionally stable, self-contained, water absorbable gelled mixture of particles of various conventional plant growing media, such as vermiculite, perlite, sand, sawdust, wood fiber, fir bark, peat, topsoil and the like. An aqueous gel of a water swellable polymer of high gel capacity in particulate form is made and mixed with the particles of plant growing media so as to coat them, preferably formed under pressure and then dried.

The gel can range from about one-half to about three percent by weight, preferably a 2% gel, depending upon the concentration of water swellable polymer desired and/or the amount of water needed to form an ideal soil block. It is essential that the light gel coat the particulates to obtain maximum adhesion between them as well as optimum dispersion of the gel.

The pressures may range from about 2 to about 150 p.s.i.g. or higher, although the optimum range appears to be about 25 to about 100 p.s.i.g. for most particulates and gels. The pressure required depends upon (1) the composition of the particulate mixture, for example, sand plus vermiculite versus vermiculite, peat and shredded foam, (2) the amount of water added. For example, a soil block can be made with about 2.5% by weight of the water swellable polymer on a dry mix basis using no pressure, by adding this polymer as a gel in four times its weight of water, but this block is not as dimensionally stable as the same block made under from about 25 to 100 p.s.i.g. pressure.

The drying time and temperature of drying is critical and effects the gel properties of the water swellable polymer. An initial cure of about 30 minutes at 440°F. followed by about 2 hours at 160°F. for a 1–½ inch cube is satisfactory. Some water swellable polymers will begin to decompose at 338°F. and will lose their gel properties. They will also rapidly lose these gel properties if small concentrations, for example, 100–600 p.p.m. of soluble salts, acids or alkalines are present. Of course, if the gel properties are deteriorated, then cohesion and dimensional stability deteriorate and the blocks tend to disintegrate.

Accordingly, there is a time-temperature relationship with respect to the drying. The gelled particles should be dried to a free moisture content of about 1%. Thus, for example, in sand and vermiculite mixtures, the total moisture content after drying would be about 1%. Peat, however, contains about 7% bound water, and drying to an extent where the peat is dried below 7% water content causes a deterioration of dimensional stability of the finished soil blocks.

The water swellable polymers include any cross-linked species of a polymer whose linear analog is water-soluble. Typical of such materials are cross-linked monovalent cation salts of polyacrylic, polymethacrylic, polysulfoethyl acrylic and polysulfoethyl methacrylic acids. other typical examples include cross-linked polyglycols having average molecular weights of from about 1,000 up to 1,000,000 or more; cross-linked substantially water-insoluble, water-swellable sulfonated alkaryl and aromatic polymers, such as, for example, cross-linked polysodium styrene sulfonate and sulfonated polyvinyl toluene salts; copolymers of such sulfonated alkaryl and aromatic materials with acrylonitriles, alkyl acrylonitriles, acrylates and methacrylates; cross-linked polyvinyl alcohol and polyacrylamide and cross-linked copolymers of polyacrylamide as, for example, the cross-linked copolymer of acrylamide and acrylic acid and of acrylamide and the monovalent salts of acrylic acid; cross-linked heterocyclic monomers, such as polyvinyl morpholinone, poly-5-methyl-N-vinyl-2-oxazolidinone and polyvinyl pyrrolidone; other cross-linked water-swellable but water-insoluble polymers or co-polymers can also be employed.

Such materials as the above-named polymers can be made by a variety of known methods. For example, the substantially water-insoluble, water-swellable, cross-linked polyacrylate salts may be prepared by chemical cross-linking as shown in British Pat. No. 719,330 or, alternatively, by subjecting a mixture of a monovalent cation salt of acrylic acid and water to the influences of high energy ionizing radiation for a period of time sufficient to effect the desired polymerization and the cross-linking of at least a portion of the polymer produced. In the latter instance, the amount of ionizing radiation should be at least about 0.5 megarad but greater or lesser amounts may be employed. In any event, the amount of radiation must be great enough to give a swellable polymer which takes in water or aqueous solutions and, in so doing, increases in volume but generally retains its original shape. With this class of polymeric materials, it is critical to the present invention that the salt-forming cation be monovalent. Representative examples of monovalent cations include, for example, the alkali metals, that is, sodium, potassium, lithium, rubidium and cesium, as well as water-soluble ammonium and ammonium-like radicals based upon the quaternary nitrogen atom.

Other methods for preparing such cross-linked materials may be found in U.S. Pat. No. 2,810,716, issued Oct. 22, 1957, to Markus. The acrylamide polymers and copolymers may be chemically cross-linked, in addition to the materials disclosed in that patent, with methylenebisacrylamide as the cross-linker.

For a further description of such water-insoluble, water-swellable polymers reference is made to U.S. Pat. Nos. 3,090,736 and 3,229,769. If desired any water-insoluble or substantiably water-insoluble adhesive can be used in an amount sufficient to coat the particles of the mix, such as disclosed in the U.S. Pat. No. 3,407,138.

These polymers differ from water-soluble polymers such as methycellulose, casein, sodium alginate, locust bean and the natural gums in that the latter form viscous liquids in low concentrations and do not form semi-rigid or solid gels. On the other hand, the cross-linked, water-insoluble, water-swellable, polymeric materials which find utility in the present invention are of a high gel capacity. By high gel capacity is meant a gel capacity of at least 20 as determined by the method disclosed in U.S. Pat. No. 3,407,138. The gel capacity is determined by dispersing a given weight of dry polymer particles in an amount of water in excess of that required to completely swell the polymer particles. The free water is then drained from the gelled polymer particles and the weight of the completely gelled particles divided by the initial weight of the dry polymer particles is the gel capacity. For example, the addition of 1.6 pounds of particulate polyacrylamide sodium salt (Gelgard) or polyacrylamide potassium salt (Norbak) to 100 gallons of water produces a thick viscous gel in about two to three minutes. Accordingly, these polymers are not easily leached out by repeated watering of the plants and continue to act as binders for the other portions of the mix over a long period of time. They also increase the water retention capacity of the mix considerably. In addition, the sodium and potassium salts have an ion exchange relationship with many of the materials of the mix and are not rapidly leached out. The potassium salts are particularly desirable for plants, and the like.

The polymer selected is mixed with water to form a one-half to three per cent gel which is then mixed with the particles of growth material, so as to coat them with the gel, shaped into the desired form and dried to a free moisture content of about 1%. The amount of the water will depend on the growing media materials used as some require more water than others.

Preferably, the drying is under pressure, and pressures from about 2 psi to about 100 psi although much higher pressures may be used, are satisfactory. For most particle growth mixes, pressures of the order of 25–100 psig are preferred. Preferably, only enough pressure so that the finished product retains its shape after being dried and being rewetted should be used, and as little as 2 psig is satisfactory for this purpose for some materials, such as sand and vermiculite. Other materials, for example, the Cornell Mixture (Table IV), with the polymer require more than 10 psig to retain a shape after being rewetted, for example, 25 psig. This results in a gelled or cohesive mass of plant growth material which is self-contained and which does not break up upon being wetted or handled.

The following Tables illustrate typical preferred mixtures which have proven satisfactory.

In these Tables Norbak is a trademark for a commercial brand of polyacrylamide potassium salt (in particles).

TABLE I

| Sample No. | 1 | 2 | 3 | 4 | 5 |
|---|---|---|---|---|---|
| Norbak, gms. | 0.5 | 1 | 2 | 3 | 4 |
| Vermiculite, gms. | 25 | 25 | 25 | 25 | 25 |
| Sand, gms. | 50 | 50 | 50 | 50 | 50 |
| Mix water, ml. | 75.5 | 76 | 77 | 78 | 79 |
| % Water pick-up | 137 | 190 | 333 | 538 | 787 |

TABLE II

| Sample No. | 1 | 2 | 3 | 4 | 5 |
|---|---|---|---|---|---|
| Norbak, gms. | 0.5 | 1 | 2 | 3 | 4 |
| Vermiculite, gms. | 25 | 25 | 25 | 25 | 25 |
| Sand, gms. | 25 | 25 | 25 | 25 | 25 |
| Peat, gms. | 10 | 10 | 10 | 10 | 10 |
| Asbestos 7004, gms. | 15 | 15 | 15 | 15 | 15 |
| Salts No. 27, gms. | 6 | 6 | 6 | 6 | 6 |
| Mix water, ml. | 163 | 164 | 166 | 168 | 170 |
| % Water pick-up | 233 | 236 | 237 | 283 | 326 |

TABLE III

| Sample No. | 1 | 2 | 3 | 4 | 5 |
|---|---|---|---|---|---|
| Norbak, gms. | 0.5 | 1 | 2 | 3 | 4 |
| Vermiculite, gms. | 25 | 25 | 25 | 25 | 25 |
| Sand, gms. | 25 | 25 | 25 | 25 | 25 |
| Peat, gms. | 10 | 10 | 10 | 10 | 10 |
| Asbestos | 15 | 15 | 15 | 15 | 15 |
| Mix water, ml. | 151 | 152 | 154 | 156 | 159 |
| % Water pick-up | 148 | 168 | 182 | 250 | 320 |

If desired Gelgard or other water-swellable material or polymers may be substituted for Norbak in the foregoing Tables with good results. In Table II, samples 1, 2 were fractured and sample 4 distorted out of shape making it impossible to obtain accurate dimension change measurements. In Table II Salts 27 are nutrient salts (B from Table XI).

A wide variety of mixes may be used in which the water swellable polymer with high gel capacity may be used to serve as a binder which does not leach out and which permits adsorption and retention of relatively large quantities of water. For example, the so-called "Cornell Mix," currently a popular soil mix may have this polymer combined with it as set forth in Table IV as follows:

TABLE IV

| | |
|---|---|
| Peat Moss | 11 bushels |
| Vermiculite | 11 bushels |
| Ground Limestone | 5 pounds |
| 5-10-5 Fertilizer | 6 pounds |
| Borax (11%B) | 10 grams |
| Superphosphate, 20% Powdered | 2 pounds |
| Iron (Chelated) | 25 grams |
| Nonionic Surfactant | 2 ounces |

To one hundred parts of this Cornell Mix is added 252 parts of a light gel of 2 parts of a water-insoluble, water swellable polymer of high gel capacity, for example, Gelgard or Norbak and 250 parts of water which coats the particles of Cornell Mix and upon drying to about 1% free moisture content, preferably formed under 100 psig pressure, provides a dimensionally stable soil block. This provides a satisfactory growth medium for germination of seeds and plant growth.

The following Tables V and VI illustrate the best results with respect to typical soil growth mixes by varying the amount of water in the mix. In the following tables Norbak was added as a 2% gel in water, 100 psig was used and the blocks were dried to a free moisture content of not more than about 1%.

TABLE V

| Dry Growth Media Formulas | No. 5N | No. 38N |
|---|---|---|
| Dry sphagnum | 4 lbs. | — |
| No. 2 Vermiculite | 2 lbs. | — |
| No. 3 Vermiculite | 2 lbs. | 3.33 lbs. |
| Shredded Nutrient Foam (⅜" screen) | 2 lbs. | — |
| Norbak | .25 lbs. | .25 lbs. |
| Al₂O₃(Dispal) | .7 gm | — |
| Superphosphate | .5 gm | — |
| Aquagro Surfactant | 5 gm | — |
| Sand | — | 6.66 lbs. |

TABLE VI

| | Effective Variation in Parts of Water Per 100 Parts of Mix | | | | |
|---|---|---|---|---|---|
| Mix | Parts of Water Per 100 Parts of Mix | Physical Character. | Mix | Parts of Water Per 100 of Mix | Physical Character. |
| No. 5N | 25 | Granular | 38N | 25 | Granular |
| No. 5N | 122.5 | Granular | 38N | 122.5 | Best |
| No. 5N | 250 | Best | 38N | 250 | Slightly Mushy |
| No. 5N | 500 | Mushy | 38N | 500 | Mushy |
| No. 5N | 750 | Mushy | 38N | 750 | Mushy |

From the foregoing tables it is noted that more water was required to give optimum physical properties, wet or dry, for formula 5N than for formula 38N. This may be due to the fibrous characteristic of peat and its poor wettability. It is also believed that what is produced is a "jelly block" with particulates dispersed therein. The structure of the particulates and the pressure applied together with the drying cycle determine the final dimensional stability of the end product, such as in the shape of blocks, rods, or other three dimensional shapes.

The following Table VII illustrates the effect of different pressures on the soil blocks formed of the 5N and 38N formulas.

TABLE VII

| Effective Pressures Pressures Lbs/sq. Inches | Results after 3 days in ½" Water | |
|---|---|---|
| | 5N | 38N |
| 8 lbs. | Sl. loose, but still cohesive | Sl. loose, but still cohesive |
| 16 | OK | OK |
| 25 | OK | OK |
| 33 | OK | OK |
| 42 | OK | OK |
| 100 | OK | OK |

The blocks of Table VII were molded under pressure in a steel mold designed to produce a pyramid shaped block and were 1-½inches high. These blocks were dried overnight at 220°F. and then subirrigated in a pan of water approximately one-quarter to one-half inches deep for three days. The blocks were then checked by hand as to cohesiveness and dimensional stability when lifted from the pan. These blocks were also set up in a greenhouse under intermittent mist or light spray to determine long term stability. All maintained their shape and relative cohesiveness after about two weeks.

The optimum conditions desired are good internal cohesion and dimensional stability when wet, but at the same time, the growth particles should be loose enough to permit good aeration for plant roots and not so dense as to prevent penetration by young roots. Any "glue"

or "gel" used should also not be easily washed away by repeated watering, that is, have very high gel capacity at low concentration in water. For example, ½% Norbak in distilled water produces a semi-solid gel. None of the other glues tried possessed the cohesive properties of Norbak or Gelgard - i.e., they did not have a high gel capacity at these concentrations. Further, some were proteins, and under moist conditions putrify in about three to five days, hence are of questionable commercial value in this application.

It is essential that the binder form a solid gel structure to provide dimensional stability as opposed to high viscosity solutions such a methyl cellulose, sodium algenate, and the like. For example, Polyhall 295, a polymer in the same chemical family as Norbak does not produce a stable block at 2.5% of the solids of the mix, even though it has a very high viscosity at this concentration. It produces a semi-fluid and slimy gel structure as opposed to the solid type of gel structure possessed by Norbak and Gelgard.

Similarly, Hydrogel 50G (Carbide) which is a polymer modified with wood flour, and described in the Herrett U.S. Pat. No. 3,336,129, does not produce a satisfactory block for the 5N and 38N formulas of Table V, using 2.5 and 5% Hydrogel and 100 pounds of pressure. Such a block rapidly disintegrates in water.

The following Table VIII illustrates various binders used in the formation of blocks of the growth particle formulas 5N and 38N, the blocks being formed at a 100 psig with 2% of the binder being used.

TABLE VIII

| Polymer or Gum | Relative Vis. at Room Temp. — 2% Sol.* | Block Formation at 100 lbs. Pressure | |
|---|---|---|---|
| | | 38N | 5N |
| Jaquar Gum A-20-B | 28 sec. | OK | OK |
| Sodium Alginate | 53 | None | OK (2nd best) |
| Locust Bean Gum | 7 | None | OK |
| Methocel No. A-15 | 4 | None | OK |
| Norbak | Solid Gel | OK | OK (Best) |
| Polyhall 295 | 103 | OK | OK |
| H₂O | 3 | — | — |

*Vis. in No. 4 Ford cup with ¼" diameter opening.

Viscosity in the above Table VIII was determined by using a No. 4 ford cup with a ¼ inch diameter opening. Note that the formula of the mix composition effects the ability to form blocks at given pressures, and that while sodium alginate does not have as high viscosity as Polyhall 295, it forms a better block, apparently because it is more like a gel than the thick syrupy solution of Polyhall 295. While the foregoing binders formed blocks as indicated at 100 psig, they did not possess the dimensional stability and cohesiveness of Norbak or Gelgard polymers after continued wetting.

The following Table IX illustrates the relative cohesive properties at 25 and 100 psig and a 1 to 1 water ratio, the blocks being dried 30 minutes at 440°F. and then two hours at 160°F., the blocks being immersed in a pan of water ¼ inches deep.

TABLE IX

| % Norbak of dry weight of Mix | 25 lbs./sq. in. pressure | 100 lbs. square in. pressure |
|---|---|---|
| .5% | Disintegrates | Holds shape better than 25 lbs. pressure, but disintegrates on handling |
| 1% | Disintegrates | |
| 2.5% | Holds shape | Best — holds shape |
| 5% | Holds shape but | Holds dimensions, but slightly |

TABLE IX-continued

| % Norbak of dry weight of Mix | 25 lbs./sq. in. pressure | 100 lbs. square in. pressure |
|---|---|---|
| | slightly soft & rubbery | soft and rubbery |

In an experiment with other binders, the concentration of methyl cellulose was increased from 2.5% to 9.1% by weight of dry mix solids, blocks were molded at 100 pounds pressure, dried 30 minutes at 440°F. and then two hours at 160°F., the blocks were placed in a pan with ¼ inch water and permitted to stand for 4 days. In these blocks the top half of the block failed to wet, but the bottom quarter disintegrated. This again demonstrates the importance of the physical characteristics of a binder that has a solid gel structure versus a high viscosity solution such as methyl cellulose and sodium alginate and the like.

The following Table X illustrates the effect of drying times and temperatures on block cohesion and rewettability. The blocks were made up of the 5N and 38N formulas under pressures of 25 pounds and 100 pounds pressure and dried under the various drying conditions as set forth in the following Table X.

TABLE X

Effective Drying Conditions
1. 30' at 440°F. plus 2 hours at 150°F.
2. 2 hours at 300°F.
3. 24 hours at 160°F.
4. 72 hours at 100°F.

After soaking in water, the results indicated that the blocks formed of 100 pounds produced a more cohesive block than did the blocks formed under 25 psig, although the differences were not great. Drying schedules 3 and 4 produced better blocks than 1 and 2. The high temperatures seemed to reduce the gel characteristics and cohesive bonding of the gel type polymers, such as Norbak.

Also, it cannot be stated that pressure alone is essential in producing a cohesive block as a very mushy mass of formula 38N (Table V) with 750 parts of water was poured in a tray and dried for 120°F. for three days. No pressure was applied, yet when the block was rewetted two weeks later, the block held together quite well, but not as well as when less water is used in the mix and some pressure applied.

Drying is a time temperature relationship. For example, the blocks can be dried by air drying for several days, however, this is not a commercial method of manufacture. The time and temperatures used, however, should be such as not to destroy the gel properties of the binder. A good cohesive block of particles of growth material capable of being rewetted many times and retaining its dimensional stability cannot be made with the polymers contemplated by this invention without going through a drying cycle.

Figure 2:
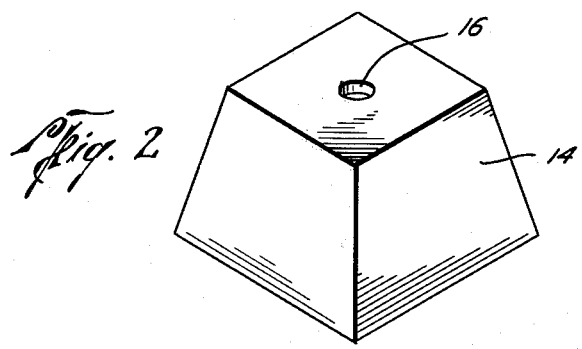
FIG. 2 is a perspective view of a gelled plant growth mix according to the invention shown in the form of a block.

As previously mentioned, the gelled, cohesive plant growth mix may be used as an insert in or coated on other materials or may be used itself for germination of seeds and plant growth. It may take a variety of forms, for example, it may be in the shape of a cylinder or rod as illustrated in FIG. 1, designated by the reference numeral 10, and which is provided with the depression 12 in its upper end for reception of the seed. The depth of the depression 12 may vary with the seed, for example, some seeds germinate better in darkness, hence a deep depression is desirable. It may be in the shape of a block 14 as illustrated in FIG. 2 which, similarly, is provided with the depression 16 in its upper end for reception of a seed. Many other shapes or combinations of the gelled plant growth mix may be utilized. For example, and while not shown in the drawings, it may be in the form of a pellet, thin slab or disc with the seedling embedded therein. This may be essentially a dry pellet although there is considerable moisture in the pellet. These may be scattered where desired, such as by hand, by machines and the like and upon application of water the seeds will germinate and the plants will grow, all as previously described.

Also as previously mentioned, the gelled plant growth mix may be in the form of an insert in or coated on a suitable carrier or container. Preferably, the container or carrier should be open-celled or should be such that root growth in any direction is not confined or impeded. In the event a foam is utilized it should be open-celled and, preferably, not less than 40% open cells. Preferably, the foam should be a water-insoluble, stable, open-cell foamed polymer matrix having intimately embedded therein plant nutrients in a leach-resistant mixture. For a detailed description of suitable nutrient plant matrixes and plant nutrients and their manufacture, reference is made to U.S. Pat. Nos. 3,373,009 and 2,988,441.

The foams described in U.S. Pat. Nos. 3,373,009 and 2,988,441 are generally hydrophobic and do not swell when moistened. While it is appreciated that Example 10 in U.S. Pat. No. 3,373,009 is characterized as hydrophilic, no data pertaining to its moisture-holding properties are given. The hydrophilic and water retention characteristics are enhanced through the use of the water-swellable polymers previously mentioned being dispersed throughout the foam in the proportions of from about 4 parts to 28 parts by weight of the polyol used in the foam. The polyols when mixed in proper proportions with these water swellable materials produced flexible, resilient, hydrophilic foams having considerably increased wetting characteristics and ability to adsorb and retain moisture. Preferably, the polyol is a mixed ethylene and propylene oxide adduct of glycerine having an approximate average molecular weight of 3000, although others may be used of which there are many.

The following nutrient foams have considerably increased swellability and, hence, water-retention and holding properties when mixed with the water-swellable materials as set forth in the following Table XI.

TABLE XI

| | Parts by Weight | | |
|---|---|---|---|
| | No. 1 | No. 2 | No. 3 |
| 1. Polyol | 500 | 500 | 500 |
| 2. Tolyuol diisocynate | 200 | 200 | 200 |
| 3. Stannous octoate catalyst | 6.5 | 6.5 | 6.5 |
| 4. Triethylene diamine | .54 | .54 | .54 |
| Water | 6.46 | 6.46 | 6.46 |
| Nutrient Salts (see formulas A,B,C) | 340(A) | 340(B) | 434(C) |
| 5. Organosilicone surfactant | 5 | 5 | 5 |
| 6. Gelgard or Norbak | 60 | 60 | 60 |
| 7. Nonionic Surfactant | 40 | 40 | 40 |
| pH (tap H$_2$O) | 6.0 | 6.4 | 5.5 |
| Initial water adsorption by weight | 600–70-0% | 600–70-0% | 1200% |

Parts by Weight

TABLE XI-continued

| *Nutrient Salts | (A) | (B) | (C) |
|---|---|---|---|
| Perlite (16 mesh) | 760 | 480 | 258 |
| Nitrated ion exchange resin | 250 | 300 | 447 |
| "Limeproof" Brown pigment | 110 | 110 | 63 |
| SRF Carbon Black | 10 | 10 | 5 |
| Potassium polymetaphosphate | 100 | 100 | 39.6 |
| Gypsum | 250 | 250 | 98 |
| Rock phosphate | 200 | 200 | 79 |
| Talc | 83 | 83 | 33 |
| **Micro Frit No. 504 | 33 | 33 | 13.4 |

**Micro Frit No. 504 is a fritted trace element mixture containing the following micronutrients:

| Percent Element Content | |
|---|---|
| Boron (B) | 3.8% |
| Copper (Cu) | 7.0% |
| Iron (Fe) | 14.0% |
| Manganese (Mn) | 7.0% |
| Molybdenum (Mo) | .07% |
| Zinc (Zn) | 7.0% |

Other micro fritted trace element mixtures such as Micro Frit No. 503, etc., can be used.

Of the above formulas, Formula No. 1 is preferred for tree seedling propagation.

For example, in 14 – 15 weeks the epicotyl heights of ten average loblolly pine seedlings in Formula No. 1 showed a 48% increase over those planted in a standard soil mixture in a 1 inch diameter fiberboard container.

Formula No. 2 is preferred for flowers and other horticultural products requiring a pH range of 6 to 6.8 in tap water. Formula No. 3 is similar to Formula No. 2, but has a lower pH in tap water and is preferred by acid-loving plants.

The foam densities with contained nutrients range from about 2.7 to about 3.2 pounds per cubic foot. A desired density is about 2.7 pounds per cubic foot with about 80% open cells, but for adequate root growth and penetration there should not be less than about 40% open cells.

pH control is mainly accomplished in the above formulas through adjustment of the nitrated ion exchange resin content in the nutrient salts formula. It can also be accomplished in a number of other ways, such as described in U.S. PaT. Nos. 3,373,009 and 2,988,441.

When saturated with water the hydrophilic foams set forth in Table XI swell about 20% in volume; whereas, the foams described in U.S. Pat. Nos. 3,373,009; 2,988,441 and Re 24,820 do not swell.

The control of cell size and the percentage of open cells are important as these factors affect the capillarity and moisture control characteristics of the foam. Cell size also has a bearing on root penetration. For example, and as previously mentioned, development of good lateral roots in pine tree seedling propagation is very important in the future stability and growth of the tree.

Many nutrient variations of the foregoing foam formulations are possible and may be used. This is one of the many advantages of synthetic media of this type, that is, specifically designed nutrient mixtures can be incorporated in foam and slowly released to the plant roots via osmosis. On the other hand, when nutrients are added to soil, potting mixtures and the like, they are usually rapidly leached out and must be replenished periodically through fertilization. This is also true of certain synthetic media where the nutrients are not surrounded by a polymer film or semipermeable membrane.

Nutrient foams also provide a uniform and sterile growth media which can be relied upon to produce consistent results. Lack of uniformity of natural media is one of the principal complaints of nurserymen and of foresters.

While the wettability and moisture retention properties of the nutrient foams disclosed in U.S. Pat. Nos. 3,373,009 and 2,988,441 can be improved by incorporating various wetting agents or surfactants, they cannot be made to adsorb the amount of water possible by intimately dispersing throughout them these crosslinked, water swellable polymers. For example, these foams can be formulated to adsorb 200% to 2,000% water; whereas this is only possible with other media within very narrow limits, that is, by changes in density and particle size, or in wetting agent solutions and drying.

Agricultural chemicals can be included in these foams, which in addition to plant nutrients and fertilizers include pesticides, herbicides, fungicides, insecticides and nematocides, hormones, growth regulators, soil sterilants and the like; such as Benomyl sold by Dupont and Benlate sold by Dow Chemical [methyl-1 (butylcarbomyl)-2 benzimidazol carbonate] and the like. For a representative list of suitable agricultural chemicals, reference is made to U.S. Pat. Nos. 3,231,363; 3,692,512; and 3,838,075. These are added to the foam during foaming, in the same manner as the plant nutrients.

These foams can be used by themselves or in shredded form and mixed with other growing media such as top soil, vermiculite, peat, etc., in various proportions. In shredded form they make excellent "permanent" mulches in that they can be made not readily biodegradable.

These foams can be used by themselves in various shapes, such as in the form of the block 18 in FIG. 11, in which the slits 20 are provided in the upper portion of the block to receive the seedling or cutting. If desired, these foams may be shredded and mixed with other growing media such as top soil, vermiculite, peat, etc., in various desired proportions. They differ from the foams described in U.S. Pat. Nos. 2,848,850 and Re 28,820 in that they are more hydrophilic.

Another aspect of the invention is the inclusion, and preferably the injection, of the water swellable mixes in these open celled form structures. Typical constructions for various types of seed and cutting propagation are illustrated in FIGS. 3 – 10.

Figure 3:
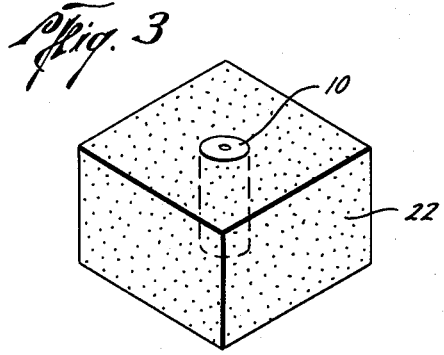
FIG. 3 is a perspective view illustrating the insert of FIG. 1 in an open cell foam in the shape of a block.

Referring to FIG. 3, a block 22 is illustrated which has the insert cylinder 10 of FIG. 1, which may or may not have a depression 12 for reception of the seed. Also, the insert may be level with the top of the block or, not shown, depressed a short distance, for example one-fourth to one-half inch for better seed retention and humidity during germination.

Figure 4:
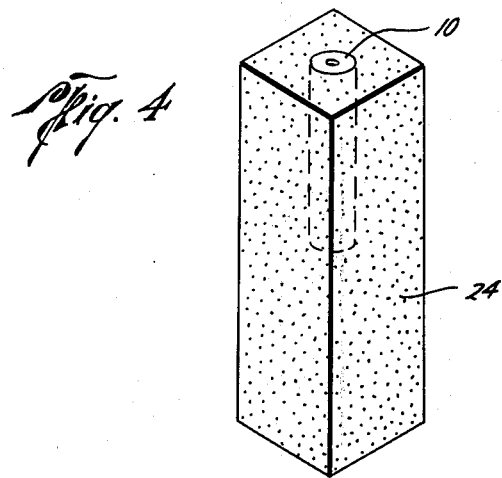
FIG. 4 is a perspective view of a modified form of a block and insert illustrated in FIG. 3 which is particularly suitable for tree propagation.

FIG. 4 illustrates the cylindrical insert 10 in an elongated open cell foamed block 24, which is particularly suitable for tree propagation. For example, the block 24 may be 1 × 1 × 6 inches in height to provide room for growth of the tap root.

Figure 5:
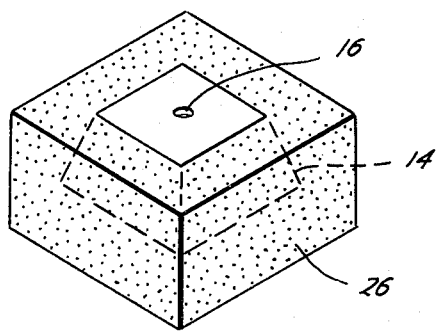
FIG. 5 is a perspective view illustrating the block insert of FIG. 2 in a block of open cell foam.

FIG. 5 illustrates an open cell foamed block 26 having the insert block 14 illustrated in FIG. 2 embedded therein. This type insert is particularly suitable for flowers, vegetables and the like.

Figure 6:
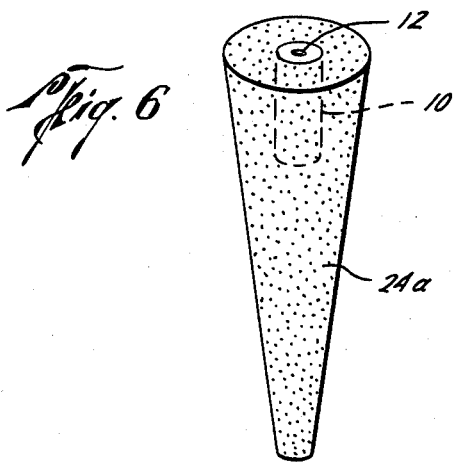
FIG. 6 is a perspective view of a modified form of FIG. 4 particularly suitable for tree propagation.

FIG. 6 illustrates a tapered shape for the foamed block illustrated in FIG. 4 and which is also particularly suitable for use as tree blocks. This shape block may be formed in a mold.

FIG. 7 illustrates an open cell foamed block similar to but tapered with respect to that illustrated in FIG. 3. This shape block may also be formed in a mold.

FIG. 9 illustrates a foam cell block having a layer of the gelled or cohesive mix on its upper surface. In this form the seedling or cutting is placed in the depression 29 in the layer 28.

The construction illustrated in FIG. 10 is similar to that of FIG. 9; however, the layer 28 of gelled or cohesive plant growth mix is sandwiched in between two layers 26a of the foam material. In this case, the slits 30 have been provided in the upper one of the layers 26a for easy reception of a seed or cutting.

If desired, the gelled or cohesive plant growth mix in any form may be coated on the surface of a foamed block, such as the block illustrated in FIG. 11, rather than dispersed throughout the foamed block.

FIG. 12 illustrates a germination insert 34 having no nutrients in a block of foam 32 having nutrients or other root stimulants which is particularly suited for germination of seeds or cuttings requiring no nutrients or in which nutrients are undesirable for germination, yet root growth is subsequently stimulated by the nutrient foam.

No more examples of various physical constructions and arrangements ae given as the gelled or cohesive plant growth mix may be combined with the foamed polymers in a variety of ways.

Referring now to FIG. 8, a method of construction of the foamed blocks with the inserts is illustrated. "Buns" or large blocks of the foam can be reacted around previously extruded and shaped inserts or may be molded so as to permit insertion of precast inserts. The large blocks are then sawed or cut with a hot wire to various shapes and sizes as required, such as along the lines of 30b–f to provide the blocks 22b–g. The blocks may or may not be connected by incomplete cutting to provide continuous units for application in automated planting equipment as illustrated in FIG. 8. Alternatively, fingers or blocks of foam may be formed in various shaped molds, for example, the blocks as illustrated in FIGS. 6 and 7, as previously mentioned.

The nutrient foams may be prepared from any desired components and in any desired manner known in the art, for example, such as described in U.S. Pat. Nos. 3,090,736; 2,988,441 and 3,373,009. The water insoluble, water swellable polymers may be prepared in any desired manner known in the art, such as described in U.S. Pat. Nos. 3,229,769; 3,090,736 and 3,407,138.

In the method of preparing the self-contained, plant growth mix, the various conventional plant growing media, such as vermiculite, perlite, sand, sawdust, wood pulp, fir bark, peat, top soil and the like are mixed with a light water gel mixture to coat the plant growing particles and to form a gelled growth media. For most materials, about one to three percent by weight, of the water insoluble, water swellable polymer in particulate form and water in an amount of from about 25% to 100% by weight is used to form the light water gel to coat the growth particles. The resulting products are then dried, preferably at temperatures from 175° to 340°F to a free moisture content of about 1%, and preferably, the coated particles may be extruded or otherwise formed under pressure into the various shapes and sizes desired. Enough pressure should be used so that the resulting product will retain its shape after rewetting. For some materials as little as 2 psi is sufficient, for other materials higher pressures are needed. These various rods or shapes are hard rigid materials when dry, but change to soft rubbery compositions when rewetted but they retain their shape. The drying cycle should be sufficiently high and long enough to sterilize the mixture, hence rendering it free of pathogens. Densities may be controlled by the composition of the mixture, by varying the amount of water swellable material, water and pressure employed. Control of density is important as it affects root penetration, swelling and water adsorption capacity.

As previously mentioned, agricultural chemicals, such as nutrient salts, plant hormones, fungicides, pesticides, herbicides, insecticides and nematocides, hormones, growth regulators, soil sterilants and the like may be incorporated in these mixtures. Where desired, fibrous materials such as asbestos, glass wool fiber, wood fiber, spaghum moss, and the like may be incorporated in the mixture to lend cohesion and physical strength to the mix for ease in handling and to prevent disintegration from repeated watering. Also, other extenders such as diatomaceous earth (Celite), $Al_2O_3$ (Dispal) fumed silica (Cab-o-sil), and pigments and colors may be included.

When used as inserts in foam blocks or as a coating or layer on the foam blocks, the high capillarity and moisture retention properties of these mixtures serve to better retain the moisture about the seeds where it is essential for seed germination. This is particularly important for small seeds, such as tobacco, lettuce, petunia and the like.

By the term "insert" is meant combined in any desired manner, such as actually inserting, injecting, coating, layering on or in the carrier or container of plant growth material.

It is apparent from the foregoing that the present invention is well suited and adapted to attain the objects and ends and has the features and advantages mentioned as well as others inherent therein.

While presently preferred embodiments of the invention have been given for the purpose of disclosure, changes may be made therein which are within the spirit of the invention as defined by the scope of the appended claims.

What is claimed is:

1. A method of preparing a self-contained live plant growth mixture comprising,
   coating particles of plant growth material with an aqueous gel of a particulate, water insoluble, water swellable, cross-linked polymer of high gel capacity, the polymer being present in an amount from about ½ to about 3% by weight based on the dry weight of the particles,
   forming the resultant mixture into a three dimensional mass, and
   drying the mass sufficiently so that the mass does not break down on being wetted.

2. The method of claim 1 where,
   the water swellable polymer is a polyacrylamide salt.

3. A plant growth mixture made according to the process of claim 1.

4. A method of preparing a self-contained life plant growth mixture comprising,
   coating particles of plant growth material with an aqueous gel of a particulate, water insoluble, water swellable, cross-linked polymer of high gel capacity, there being present about ½ to about 3% of the polymer and from about 25 to 250% water by weight based on the dry weight of the particles, and
   forming the resulting mixture into a three-dimensional mass under sufficient pressure and drying of the formed mass sufficiently so that the mass does not break down on being wetted.

5. The method of claim 4 where,
   the water swellable polymer is a polyacrylamide salt.

6. A plant growth mixture made according to the process of claim 4.

7. A method of preparing a self-contained live plant growth mixture comprising,
   coating particles of plant growth material with an aqueous gel of a particulate, water insoluble, water swellable cross-linked polymer of high gel capacity, there being present about ½ to 3% of polymer and from about 25 to 250% water by weight based on the dry weight of the particles,
   forming the resulting mixture into a three-dimensional mass under pressure of from about 2 to about 100 psig, and
   drying the formed mass sufficiently so that the mass does not break down upon being wetted.

8. The method of claim 7 where,
   the water swellable polymer is a polyacrylamide salt.

9. A plant growth mixture made according to the process of claim 7.

10. A live plant growth matrix comprising,
    a stable, water insoluble, open-celled foamed polymer having a top portion, and
    an insert of a self-contained plant growth mixture comprised of particles of plant growth material coated with and bound together by an aqueous gel of a particulate, water insoluble cross-linked polymer of high gel capacity.

11. The plant matrix of claim 10, including plant nutrients in the foamed polymer.

12. A live plant growth matrix comprising, a plant growth medium having an open-celled structure, and
    a self-contained plant growth mixture comprised of particles of plant growth material coated with and bound together by an aqueous gel of a particulate, water insoluble, cross-linked polymer of high gel capacity.

13. The plant matrix of claim 12 including plant growth nutrients in the plant growth medium.

14. A live plant growth matrix comprising,
    a stable, water insoluble, open-celled foamed polymer having a top portion, and
    an insert of a self-contained plant growth mixture comprised of plant growth particles coated with and bound together by an aqueous gel comprising from about ½ to about 3% of a particulate, water insoluble, cross-linked polymer of high gel capacity, based on the dry weight of the plant growth particles inserted into the top portion of the foamed polymer.

15. The plant matrix of claim 14 including,
    plant growth nutrients in the foamed polymer.

16. A plant matrix comprising,
    a stable, water insoluble, open-celled foamed polymer having a top portion, and
    from about 4 parts to about 28 parts by weight of a water swellable polymer to about 100 parts of polyol dispersed throughout the foamed polymer, and
    an insert of a self-contained plant growth mixture comprised of plant growth particles coated with and bound together by an aqueous gel of a particulate, water insoluble, cross-linked polymer of high gel capacity inserted into the top portion of the foamed polymer.

17. The plant matrix of claim 16 including, plant growth nutrients in the foamed polymer.

18. A live plant growth matrix comprising, a stable, water insoluble, open-celled foamed polymer having a top portion, and from about 4 parts to about 28 parts by weight of a water swellable polymer to about 100 parts of polyol dispersed throughout the foamed polymer, and an insert of a self-contained plant growth mixture comprised of plant growth particles coated with and bound together by an aqueous gel of a particulate, water insoluble, cross-linked polymer of high gel capacity inserted into the top portion of the foamed polymer.

19. The plant matrix of claim 18 including plant growth nutrients in the foamed polymer.

20. A self-contained live plant growth mixture comprising, from about ½ to about 3% by weight of a particulate, water insoluble, water swellable cross-linked polymer, and the remainder particles of plant growth material, the water swellable polymer being gelled and coating the plant growth particles and binding them into a cohesive mass.

21. The plant matrix of claim 20 where, the polymer gel includes about 1% water.

22. The plant matrix of claim 21 where, the water swellable polymer is a poly-acrylamide salt of high gel capacity.

23. The plant matrix of claim 20 where, the particles of plant growth material include agricultural the 24. The plant matrix of claim 22 where, the polymer gel has about 1% free water therein.

25. The plant matrix of claim 20 where, the particles of plant growth material include plant nutrients.

26. A live plant growth matrix comprising, a plant growth medium having an open-celled structure and a top portion, and the plant growth mixture of claim 20 inserted into the top portion of the plant growth medium.

27. The plant matrix of claim 20 wherein, the water swellable polymer is a polyacrylamide salt of high gel capacity.

28. The plant matrix of claim 20 where, the plant growth mixture has about 1% by weight free water and, the water swellable polymer is a polyacrylamide salt of high gel capacity.

* * * * *